United States Patent
Shinozaki et al.

(10) Patent No.: US 9,134,863 B2
(45) Date of Patent: Sep. 15, 2015

(54) INPUT DEVICE FOR CAPACITIVE TOUCH PANEL, INPUT METHOD AND ASSEMBLY

(75) Inventors: Kenji Shinozaki, Tokyo (JP); Masahiro Suzuki, Tokyo (JP)

(73) Assignee: SHOWA DENKO K.K., Tokyo (JP)

( * ) Notice: Subject to any disclaimer, the term of this patent is extended or adjusted under 35 U.S.C. 154(b) by 40 days.

(21) Appl. No.: 13/882,941

(22) PCT Filed: Sep. 5, 2011

(86) PCT No.: PCT/JP2011/070156
§ 371 (c)(1),
(2), (4) Date: May 1, 2013

(87) PCT Pub. No.: WO2012/060149
PCT Pub. Date: May 10, 2012

(65) Prior Publication Data
US 2013/0222342 A1    Aug. 29, 2013

(30) Foreign Application Priority Data
Nov. 2, 2010   (JP) .................................. 2010-246120

(51) Int. Cl.
G06F 3/044   (2006.01)
G06F 3/01    (2006.01)
(Continued)

(52) U.S. Cl.
CPC ................ *G06F 3/044* (2013.01); *G06F 3/014* (2013.01); *G06F 3/039* (2013.01); *G06F 3/03545* (2013.01); *G06F 2203/0331* (2013.01)

(58) Field of Classification Search
CPC ..... G06F 3/044; G06F 3/014; G06F 3/03545; G06F 3/039; G06F 2203/0331
USPC .................................................. 345/156–184
See application file for complete search history.

(56) References Cited

U.S. PATENT DOCUMENTS 2,335,320 A * 11/1943 Swietek ............................ 2/163
5,011,186 A    4/1991 Bodziak et al.
(Continued)

FOREIGN PATENT DOCUMENTS

GB    2433413 A *  6/2007
JP    57-166236 U   10/1982
(Continued)

OTHER PUBLICATIONS

International Search report for PCT/JP2011/070156 dated Nov. 15, 2011.
(Continued)

*Primary Examiner* — Larry Sternbane
(74) *Attorney, Agent, or Firm* — Sughrue Mion, PLLC (57) ABSTRACT

Disclosed is an input device for a capacitive touch panel, which is an input device for inputting the position on the touch panel by making the input device contact with the touch panel, including an insulating layer (11) having flexibility and optical permeability, and a conductive layer (12) having optical permeability and laminated onto the insulating layer (11), and the input device (10) is integrally formed into a cylindrical shape so that the insulating layer (11) and the conductive layer (12) become a portion to be contacted with the touch panel. Thereby, users less likely to have a sense of wear and tear of fingers, the position pointed by the input device on the touch panel is precisely recognized with ease, the accuracy of the position detected by the touch panel is improved, and input means is less likely to be lost though the input device is lost.

12 Claims, 5 Drawing Sheets

(51) Int. Cl.
*G06F 3/0354* (2013.01)
*G06F 3/039* (2013.01)

(56) References Cited

U.S. PATENT DOCUMENTS

| | | | | |
|---|---|---|---|---|
| 5,217,767 | A | | 6/1993 | Gutman et al. |
| 5,535,105 | A | * | 7/1996 | Koenen et al. ................ 362/570 |
| 5,784,860 | A | | 7/1998 | Fujikawa et al. |
| 6,497,933 | B1 | | 12/2002 | Yeager et al. |
| 6,618,861 | B2 | * | 9/2003 | Saks et al. ...................... 2/161.7 |
| 2005/0149258 | A1 | * | 7/2005 | Gargi ............................ 701/208 |
| 2007/0247793 | A1 | * | 10/2007 | Carnevali ...................... 361/681 |
| 2009/0078478 | A1 | | 3/2009 | Newman |
| 2009/0262637 | A1 | * | 10/2009 | Badaye et al. ................ 369/126 |
| 2010/0090966 | A1 | * | 4/2010 | Gregorio ....................... 345/173 |
| 2012/0026127 | A1 | * | 2/2012 | Kim ............................... 345/174 |
| 2013/0105193 | A1 | | 5/2013 | Kirk et al. |
| 2013/0215026 | A1 | | 8/2013 | Shinozaki et al. |

FOREIGN PATENT DOCUMENTS

| | | |
|---|---|---|
| JP | 01-102620 A | 4/1989 |
| JP | 07-104925 A | 4/1995 |
| JP | 2009-230179 A | 10/2009 |
| JP | 2009-259062 A | 11/2009 |
| WO | 2010/044962 A2 | 4/2010 |

OTHER PUBLICATIONS

Daniel Webster; How to Make a Free Capacitive Stylus; Feb. 24, 2010; <http://http://pocketnow.com/tweaks-hacks/how-to-make-a-free-capacitive-stylus> [incorporating accompanying explanatory video: "How to Make a Free Capacitive Stylus" uploaded by Pocketnow.com <http://youtube./LBpo7USR818/].

International Search Report dated Nov. 15, 2011 for PCT/JP2011/070157.

* cited by examiner

INPUT DEVICE FOR CAPACITIVE TOUCH PANEL, INPUT METHOD AND ASSEMBLY

CROSS REFERENCE TO RELATED APPLICATIONS

This application is a National Stage of International Application No. PCT/JP2011/070156 filed Sep. 5, 2011, claiming priority based on Japanese Application No. 2010-246120 filed Nov. 2, 2010, the contents of all of which are incorporated herein by reference in their entirety.

TECHNICAL FIELD

The present invention relates to an input device or the like used for, for example, a capacitive touch panel.

BACKGROUND ART

In recent years, touch panels which enable information to be inputted by touching a display screen of a display device have increased in importance. A sensor which detects the contact is applied to the display screen of the touch panel, and the sensor detects the position of the contact with a finger or the like on the display screen, thereby information is inputted. So-called capacitive touch panels, in which a sensor adopting a method of detecting the position by capturing the change of the capacitance between a finger or the like and a conducting layer is used as the sensor, have been becoming popular.

Patent Document 1 discloses a touch pen in which a grip part is formed to be a bar whose cross-sectional shape is substantially circular, concave grooves (holding portions) having dents are symmetrically formed on each side, and an orientation to the periphery direction is provided.

Patent Document 2 discloses a touch pen for inputting information into a device by coming into contact with a touch panel of a computer, that includes a jig tool wearable on a finger and a pen point attached to the jig tool.

CITATION LIST

Patent Literature

Patent Document 1: Japanese Patent Application Laid-Open Publication No. 2009-230179
Patent Document 2: Japanese Patent Application Laid-Open Publication No. 2009-259062

DISCLOSURE OF INVENTION

Technical Problem

In the case of using a finger to input into the touch panel, for example, a touch panel screen gets contaminated with skin oil and unclear, or the users have a sense of wear and tear of finger by a long period of use, because the touch panel directly contacts with a finger. Further, in the case of using a finger, it is difficult to reduce a contact area between the finger and the touch panel, and it tends to decrease the accuracy of detecting the position by the touch panel.

On the other hand, for example, an input device of pen type such as a stylus pen and the like tends to be lost, and if lost, a means for inputting into the touch panel is lost in some cases. Moreover, the input device of these pen types has a larger area contacting with the touch panel compared to a ballpoint pen, so it is difficult to accurately recognize the position indicated by the input device on the touch panel.

In light of the above-described problem, an object of the present invention is to provide an input device and the like for the capacitive touch panel, with which the users are less likely to have a sense of wear and tear of finger and can precisely recognize the position pointed by the input device on the touch panel with ease as well, and, which improves the accuracy of detecting the position by the touch panel, further, is less likely to lose input means though the input device is lost.

Solution to Problem

An input device according to the present invention for inputting a position on a capacitive touch panel by making the input device contact with the touch panel includes: an insulating layer that has flexibility and optical permeability, and a conductive layer that has optical permeability and is laminated onto the insulating layer, wherein the insulating layer and the conductive layer are integrally formed into a cylindrical shape so that the insulating layer and the conductive layer become a portion (sometimes referred to as just "the contacting surface" below) to be contacted with the touch panel.

Here, it is preferable that an adhesive layer that is provided at least on a part of the insulating layer and the conductive layer is included. It is preferable that the cylindrical shape is formed so that the insulating layer is provided outside rather than the conductive layer, moreover, the shape can be determined as a shape to be worn on a finger. Furthermore, it is preferable that a figure for illustrating an input position into the touch panel is pictured at least on any one of the insulating layer and the conductive layer.

An input device according to the present invention for inputting a position on a capacitive touch panel by making the input device contact with the touch panel includes: an insulating layer that has flexibility, and a conductive layer that is laminated onto the insulating layer, wherein the insulating layer and the conductive layer are integrally formed into a cylindrical shape and have optical permeability at least on a portion thereof to be contacted with the touch panel.

Further, an input device according to the present invention for inputting a position on a capacitive touch panel by making the input device contact with the touch panel includes: an insulating layer that has flexibility and optical permeability, and a conductive layer that has optical permeability and is laminated onto the insulating layer, wherein the insulating layer and the conductive layer become a contacting surface and can be integrally bended so as to be fitted to the shape of a supporting body.

Here, it is preferable that an adhesive layer provided at least on a part of the insulating layer and the conductive layer is included. The supporting body can be a finger. Moreover, it is preferable that the insulating layer and the conductive layer integrally form a shape of pentagon or hexagon. Also such a polygonal shape may have corners chamfered.

An input method according to the present invention includes: making the above-described input device contact with the touch panel to input a position on a capacitive touch panel.

Here, the contacting surface of the input device has at least optical permeability, preferably transparent.

An assembly according to the present invention in which input devices for inputting a position on a capacitive touch panel by making the input device contact with the touch panel are gathered, wherein: the input devices include, at a contacting surface, an insulating layer that has a flexibility and optical permeability, and a conductive layer that has optical permeability and is laminated onto the insulating layer; and the input devices are gathered by any one of (1) to (3) below, (1) further including an adhesive layer provided at least on a part of the input device and making the input devices laminated with the adhesive layer interposed therebetween, (2) planately combining the input devices with each other, and (3) forming the input device to be cylindrical shape and making the input devices of cylindrical shape laminated.

Advantageous Effects of Invention

According to the present invention, it is possible to provide an input device and the like for the capacitive touch panel, with which the users are less likely to have a sense of wear and tear of finger and can precisely recognize the position pointed by the input device on the touch panel with ease as well as, and, which improves the accuracy of detecting the position by the touch panel, further, is less likely to lose input means though the input device is lost.

DESCRIPTION OF EMBODIMENTS (Description of Input Device)

Hereinafter, an exemplary embodiment according to the present invention will be described in detail with reference to the attached drawings.

Figure 1A:
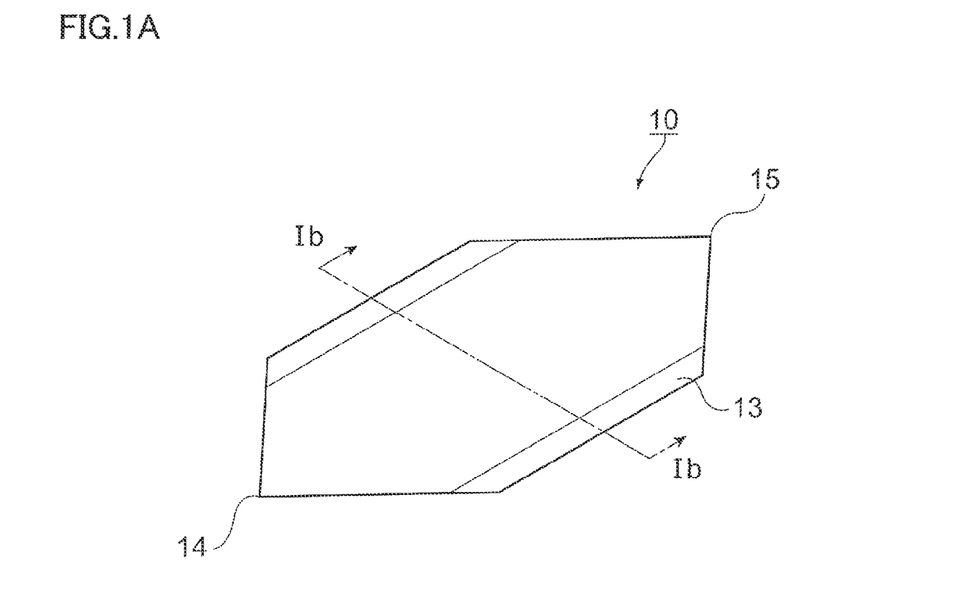
FIGS. 1A and 1B are diagrams for illustrating one specific example of the input device to which the exemplary embodiment is applied.
Figure 1B:
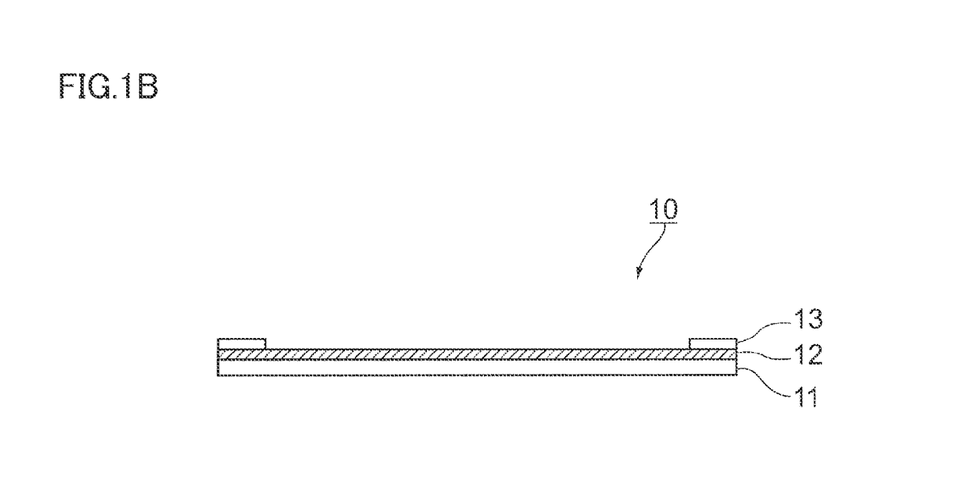

FIGS. 1A and 1B are diagrams for illustrating a specific example of input device to which the exemplary embodiment is applied.

An input device 10 is an input device for inputting a position on a touch panel by contact with a capacitive (capacitive-type, capacitive coupling type) touch panel. FIG. 1A is a perspective view for illustrating the entire input device 10, and FIG. 1B is a Ib-Ib cross-sectional view in FIG. 1A.

As shown in FIGS. 1A and 1B, the input device 10 includes an insulating layer 11 having flexibility, a conductive layer 12 formed to be laminated onto the insulating layer 11, and an adhesive layer 13 provided onto a part of the conductive layer 12. The insulating layer 11 and the conductive layer 12 integrally form a planate hexagon.

The insulating layer 11 is a base material for forming the conductive layer 12, and has insulating property. Also the insulating layer 11 has flexibility and can be bended. Thereby, it is possible to be fitted to the shape of a supporting body for wearing the input device 10. Here, the supporting body is a finger or a writing material, although detailed description thereof will be given later. The shape of the input device 10 can be fitted to the shape of the supporting body, for example, by winding the input device 10 around a finger or a writing material.

In the input device 10 of the exemplary embodiment, an area (contacting surface) where the insulating layer 11 and the conductive layer 12 contact with the touch panel has optical permeability.

Figure 2A:
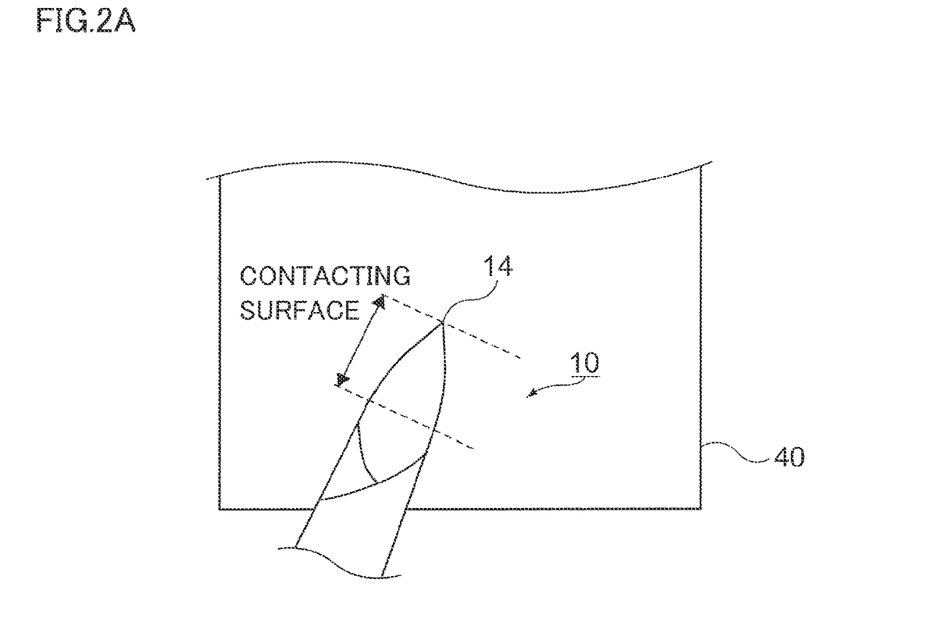
FIGS. 2A and 2B are diagrams for illustrating a state in a case where the input device is actually contacted with the touch panel.
Figure 2B:
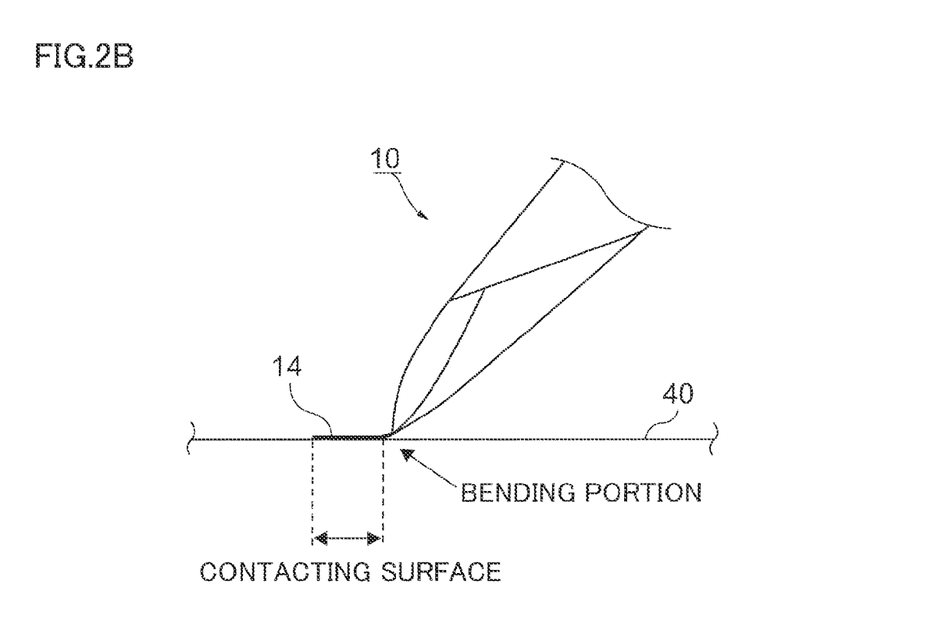

FIGS. 2A and 2B are diagrams for illustrating a state in a case where the input device 10 is actually contacted with a touch panel 40. Here, FIG. 2A is a diagram for illustrating the state viewed from upper direction in the case where the input device 10 contacts with the touch panel 40. FIG. 2B is a diagram for illustrating the state viewed from the cross direction in the case where the input device 10 contacts with the touch panel 40.

As shown in FIG. 2B, in the case where the input device 10 of the exemplary embodiment contacts with the touch panel 40, a portion is bended at the substantially constant length from a leading portion 14 of the input device 10, to form the contacting surface that has a predetermined area. In FIG. 2A and FIG. 2B, the range of the contacting surface of the input device 10 is shown with a dotted line. As shown in FIG. 2A, the triangle area from the leading portion 14 to the bending portion is the contacting surface. Therefore, in the case of using the input device 10 of the exemplary embodiment, an area contacting with the touch panel 40 tends to be larger compared to a stylus pen and the like. As a result, sometimes it is difficult to visibly recognize the input position of the input device 10 on the touch panel 40.

Thus, in the input device 10 of the exemplary embodiment, by making at least the contacting surface optically permeable, the input position of the input device 10 on the touch panel 40 is visibly recognized with ease. It should be noted that the entire input device 10 can be optically permeable. Here, the optical permeability efficiency of the portion with optical permeability area on the input device 10 can be approximately a degree to which light and dark of an image under the input device 10 can be recognized when the planate input device 10 is put on the touch panel 40. In the case of using under indoor condition, in which the background is dark, the optical permeability efficiency can be 5% or more, and more preferably 20% or more. Note that, under outdoor condition and the like, in which the background is light, it is easy to visibly recognize when the optical permeability efficiency is as higher as possible, therefore, for example, the optical permeability efficiency is still more preferably 60% or more.

Moreover, the contacting surface may be opaque, but more preferably transparent so that it is easier to recognize the image of the touch panel 40 under the contacting surface.

As the material of the insulating layer 11 which satisfies such requirements, for example, a resin sheet can be used. More specifically, the resin sheet made with polypropylene (PP), polyester, nylon, polyvinyl chloride (PVC), polycarbonate (PC), polyethylene terephthalate (PET), or the like can be used. The thickness of such resin sheet may be in the range of 10 μm to 300 μm, for example.

As the material of the conductive layer 12 which satisfies the above-mentioned requirements, metallic thin film, conductive oxide, and conductive polymer are included. More specifically, as metals, aluminium, silver, titanium, and gold are included. As the conductive oxide, indium tin oxide, indium zinc oxide, niobium oxide, and titanium oxide are included. As the conductive polymer, including dopant, polythiophene, polypyrrole, polyaniline, derivative of those and the like are included.

The conductive layer 12 has the conductive property, and is provided to flow faint current between the touch panel and a human body. Thereby, the input device 10 functions as the input device for capacitive touch panel.

If the thickness of the conductive layer 12 is too thin, the conductive property can not be ensured, however, if the thickness is too thick, optical permeability decreases and plastic deformation tends to occur due to the bend which occurs when adjusting the shape of the input device 10 with that of the supporting body. Practically, when the input device 10 is used, the bend causes wrinkles. If the bend is caused in the leading portion 14 where the input device 10 contacts with the touch panel, the contact between the input device 10 and the touch panel is likely to be a point contact. It is less likely to cause a contact failure when the contact between the input device 10 and the touch panel is a surface contact. Therefore, in terms of ensuring the conductive property and making less likely to cause a contact failure, the conductive layer 12 of the exemplary embodiment is preferably formed by the above-mentioned material. The thickness can be, for example, preferably in the range of 10 nm to 300 nm, more preferably 10 nm to 100 nm, and still preferably 10 nm to 50 nm. It should be noted that the conductive layer 12 may be provided only a part of the insulating layer 11, as long as the conductive property is ensured.

Such conductive layer 12 can be formed by coating the top of the insulating layer 11 with evaporation coating and the like. In this case, the insulating layer 11 and the conductive layer 12 can be regarded as a laminate film.

The adhesive layer 13 is provided so as to keep the shape of the input device 10 when the input device 10 is fitted to the shape of the supporting body, or to fix the supporting body to the input device 10 when the input device 10 is bonded to the supporting body.

In order to exert such a feature, the adhesive layer 13 is preferably composed of pressure sensitive adhesives. In other words, it is preferable that the adhesion is completed at the moment adhesive parts are set together. Further, in the case where the supporting body is bonded to the input device 10 to be fixed, the adhesion between the supporting body and the input device 10 is not necessarily strong, and it is more preferable that the input device 10 can be separated from the supporting body with ease. In the exemplary embodiment, the adhesive layers 13 are provided on two portions, that is, a portion along with one of the lines of the hexagon shape of the input device 10 and a portion along with a line opposite to the line.

Further, in the exemplary embodiment, a figure for illustrating the input position into the touch panel 40 is preferably pictured on the contacting surface of the input device 10.

Figure 3A:
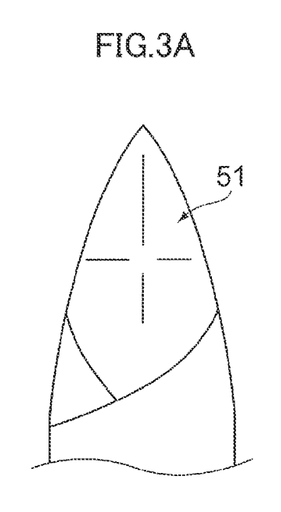
FIGS. 3A to 3C are diagrams for illustrating specific examples of figures indicating the input position.
Figure 3B:
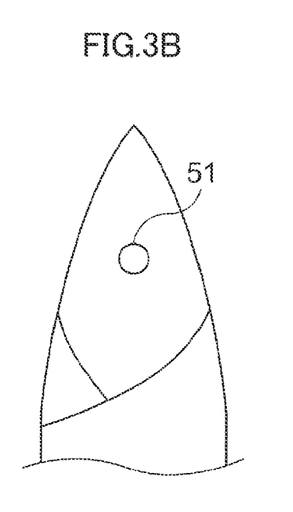
Figure 3C:
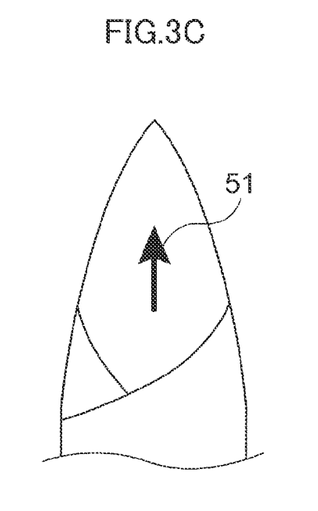

FIGS. 3A to 3C are diagrams for illustrating specific examples of the figure indicating the input position.

Here, FIG. 3A shows a figure of cross as this FIG. 51. In this case, the central part of the cross means the input position. Also FIG. 3B shows a figure of circle as this FIG. 51. In this case, inside the circle means the input position. Further, FIG. 3C shows a figure of arrow as this FIG. 51. In this case, the leading point of the arrow means the input position.

By picturing these FIG. 51 on the contacting surface of the input device 10, it becomes easier for the users to visibly recognize the input position into the touch panel 40 by the input device 10. For practical purposes, the FIG. 51 is pictured at least one of the insulating layer 11 and the conductive layer 12 by printing and the like, although detailed description thereof will be given later.

By using the input device 10, it is not necessary for the users to directly touch the touch panel with fingers to handle the touch panel, and the users are less likely to have a sense of wear and tear of finger. Further, the accuracy of detecting the input position of the input device 10 can be improved, because it is possible to visibly figure out the condition of the touch panel under the contacting area.

In the exemplary embodiment, the input device 10 is configured with a double structure of the insulating layer 11 and conductive layer 12. If only the insulating layer 11 is provided, it is difficult to flow faint electric current between the touch panel and a human body, and the input device does not work. Also, if only the conductive layer 12 is provided, in the case where the conductive layer 12 is formed with metals, as described above, it is likely to be a point contact on the leading portion 14 and to cause a contact failure. On the other hand, in the input device 10 of the exemplary embodiment, in which the insulating layer 11 is composed of a resin sheet and the like having flexibility, the leading portion 14 is elastically deformed and bended to contact with the touch panel. Therefore, it is likely to be the surface contact and it becomes easier to flow faint electric current.

Moreover, compared to the stylus pen and the like having a hard leading portion, the input device 10 of the exemplary embodiment makes it less likely to cause damage and the like on the surface of the touch panel and less likely to damage the touch panel.

Further, many of the touch panels in recent years can detect plural contacting points. That is, so-called multi-touch is available, and by using the multi-touch to perform a predetermined operation to the touch panel, for instance, various sorts of functions including reduction and enlargement of images and the like are realized. However, in the case of using a stylus pen and the like as the input device, it is difficult to touch plural points on the touch panel at the same time. On the other hand, with the input device 10 of the exemplary embodiment, by wearing the input devices 10 on plural fingers, it is easy to touch plural points on the touch panel at the same time.

Further, by using the input device 10 of the exemplary embodiment, a so-called disposable input device is realized.

For instance, it is easy to carry an assembly of the input devices 10, described further below, which can be used by taking as much the input devices 10 as need to be worn on the pen or on the finger whenever the users need. The used input devices 10 may be discarded.

Alternatively, the need for the users of carrying around with the input device 10 decreases by putting the input device 10 at a place to use beforehand. Further, it is much easier to provide the alternate input device 10 than a stylus pen and the like in the case of being lost.

Further, in the case of using a resin sheet as the insulating layer 11 for the input device 10 of the exemplary embodiment, it is possible to print on it. In other words, it is possible to print the FIG. 51 which indicates the indicating position on the input device 10. It is easy to make an excellent design because a name or the usage of the input device 10, or a various sorts of patterns can be printed.

It should be noted that, in the exemplary embodiment, the insulating layer 11 and the conductive layer 12 are individually configured as a single layer; however, they can be individually configured as a double layer. That is, the insulating layer 11 and the conductive layer 12 can be laminated alternately.

Further, in the exemplary embodiment, the adhesive layer 13 is provided on the conductive layer 12, however, it is not limited thereto and the adhesive layer 13 may be provided on the insulating layer 11.

It is more preferable to provide the adhesive layer 13 in the point that users can freely set the shape of the cylindrical input device 10 to fit the shape of the individual supporting body. Note that, the input device 10 may be distributed in a state of cylindrical shape beforehand. In this case, it is considered not to provide the adhesive layer 13 but to bond by pressure bonding and the like for maintaining the cylindrical shape. In this case, the adhesive layer 13 is not always necessary.
(Description of Usage Manner of the Input Device)

Specific usage manners of the above-described input device 10 will be described.

Figure 4A:
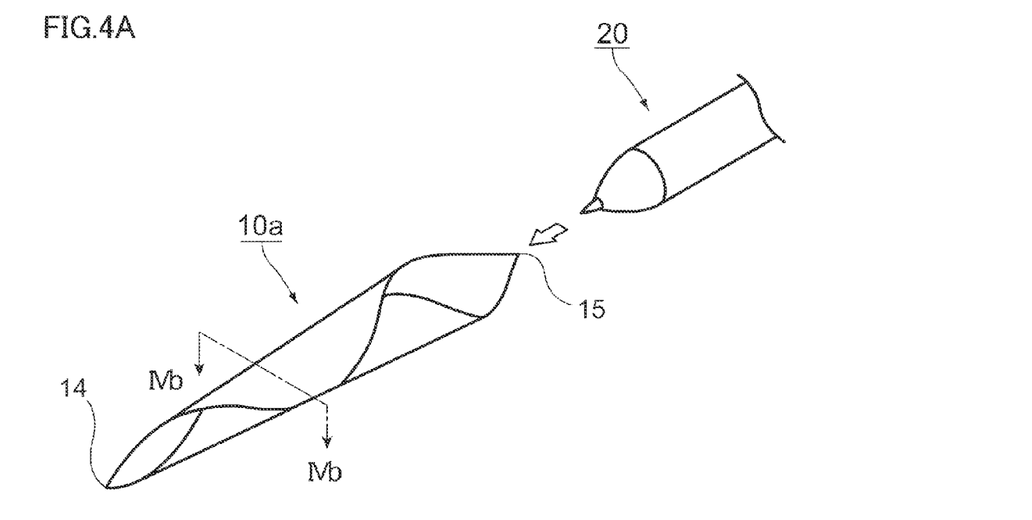
FIGS. 4A to 4C are diagrams for illustrating the first to third specific examples of usage manner of the input device.
Figure 4B:
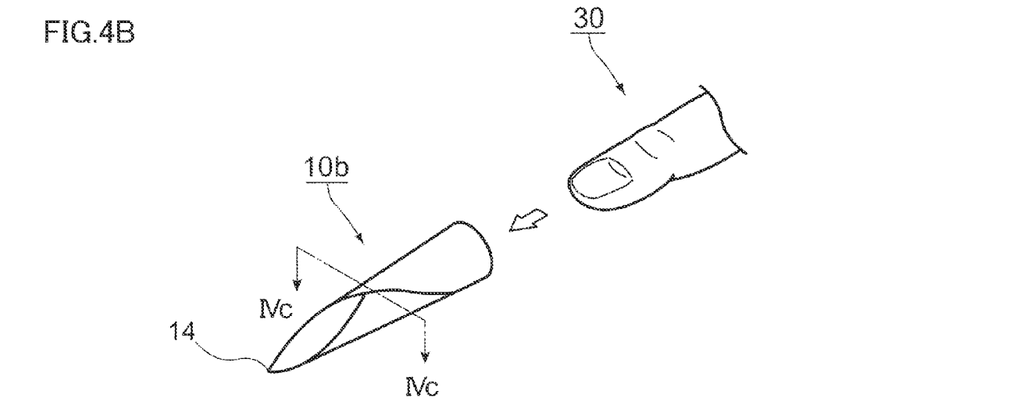
Figure 4C:
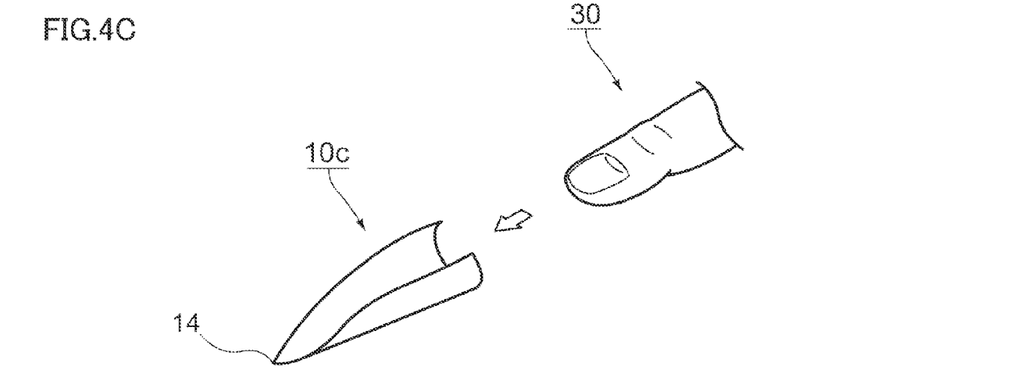

FIGS. 4A to 4C are diagrams for illustrating the first to third specific examples of usage manner of the input device 10.

Here, FIG. 4A is a diagram for illustrating the first example of usage manner of the input device 10.

FIG. 4A shows the case where the input device 10 shown in FIG. 1 forms a cylindrical shape by winding to fit the shape of a writing material 20. It should be noted that, here, the input device 10 of the cylindrical embodiment is referred to as an input device 10a for the sake of discrimination. This input device 10a is winded as the insulating layer 11 outside and as the conductive layer 12 inside, and is bonded and fitted by the adhesive layer 13 provided on the edge of the input device 10, so that this input device 10a can keep a cylindrical shape. The input device 10a is used in a state of being worn on the writing material 20 inserted from the side of a leading portion 15 at the position opposite to the leading portion 14 as well.

In the exemplary embodiment, the input device 10 forms a tapering shape from the leading portion 15 to the leading portion 14 to form a cylindrical shape. Thereby, when the input device 20 is inserted from the leading portion 15, the insertion can be easily performed, but the writing material 20 can not penetrate toward the direction of the leading portion 14. Thus, it is possible for the input device 10a to be worn steadily on the writing material 20. Also at this time, with the adhesive layer 13 provided on the entire surface of the conductive layer 12, this adhesive layer 13 and the writing material 20 are bonded and fitted, thereby it is possible to stabilize them moreover.

Note that, it is possible to use the input device 10a provided as the cylindrical embodiment, by wearing the input device 10 on the writing material 20 to wind. At this time, a mark for deciding the position (for instance, a mark for fitting the leading position of the writing material 20) is preferably pictured on the input device 10 when the input device 10 is worn.

The users of the touch panel can input information into the touch panel by gripping the input device 10a worn on the writing material 20 to make the leading portion 14 of the input device 10a contact with the touch panel. At this time, at least a part of the input device 10a is preferably contacted with a hand gripping the writing material 20.

In this case, the writing material 20 can be an ordinal writing material like a pen and the like. So, in the case of this embodiment, the users can input information into the touch panel by using their favorite or familiar writing material. In this case, a device available for both inputting into the touch panel and writing in an ordinal way can be provided.

FIG. 4B is a diagram for illustrating the second example of usage manner of the input device 10.

FIG. 4B shows the diagram, in which the input device 10 shown in FIG. 4A is cut at the IVb-IVb in FIG. 4A. Here, this input device 10 is referred to as an input device 10b for the sake of discrimination. The input device 10b is used in the state of being inserted from the side of the cutting surface to be worn on the finger 30. In the exemplary embodiment, the input device 10b forms a tapering shape from the cutting surface to the leading portion 14 as described above. Therefore, the finger 30 can not penetrate toward the leading portion 14. Thereby, the input device 10b can be worn on the writing material 20 steadily. Further, with the adhesive layer 13 provided on the entire surface of the conductive layer 12, this adhesive layer 13 and the finger 30 are bonded and fitted, thereby it is possible to stabilize them moreover.

The users of the touch panel can input information into the touch panel by making the leading portion 14 of the input device 10b worn on the finger 30 contact with the touch panel.

FIG. 4C is a diagram for illustrating the third example of the usage manner of the input device 10.

FIG. 4C shows a diagram, in which the input device 10b in FIG. 4B is cut at the IVc-IVc in FIG. 4B additionally. Here, this input device 10 is referred to as an input device 10c for the sake of discrimination. The input device 10c, which does not have enough width to wind around the entire finger 30, is used in a state of being worn while contacting with a part of the finger 30. In this case, the input device 10c and the finger 30 are bonded and fitted by the adhesive layer 13.

The users of the touch panel can input information into the touch panel by making the leading portion 14 of the input device 10c worn on the finger 30 contact with the touch panel.

Therefore, the input device 10 of the exemplary embodiment can be fitted to the shape of the supporting body with ease, because the insulating layer 11 and the conductive layer 12 can be bended integrally. In order to further facilitate inputting into the touch panel, it is easy to adjust the length by cutting or the like as in the cases of the above-described inputting devices 10b and 10c. In the case where the input devices 10b and 10c are rolled out, for example, they have the shape of being cut at the Ib-Ib in FIG. 1A, and in this case, they form a shape of pentagon.

Note that, in this exemplary embodiment, the conductive layer 12 is winded as inside, so the insulating layer 11 is outside. Thereby it is the insulating layer 11 to contact with the touch panel directly. However, also in this case, from the capacitive touch panel, it is possible to flow faint electric current through the input devices 10a, 10b, and 10c, and a human body. Thus, there is no problem of inputting information into the touch panel by the input devices 10a, 10b, and 10c.

The input devices 10a, 10b, and 10c are provided by winding the input device 10 shown in the FIGS. 1A and 1B as the insulating layer 11 outside and as the conductive layer 12 inside, however, it can be provided by winding as the insulating 11 inside and as the conductive layer 12 outside.

It should be noted that, the means for inputting information into the touch panel by using such above-described input devices 10a, 10b, and 10c, can be considered as an input method featured of inputting the position on the touch panel by making the input devices 10a, 10b, and 10c contact with the capacitive-type touch panel.
(Description of Assembly of Input Device)

An assembly, in which input devices 10 are gathered, will be described.

Figure 5A:
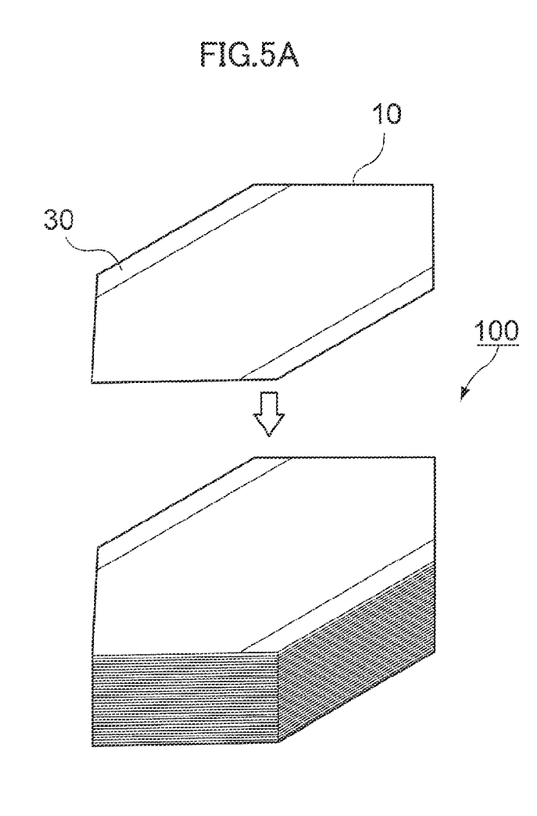
FIGS. 5A to 5C are diagrams for illustrating the first to third specific examples of the assembly of the input devices.
Figure 5B:
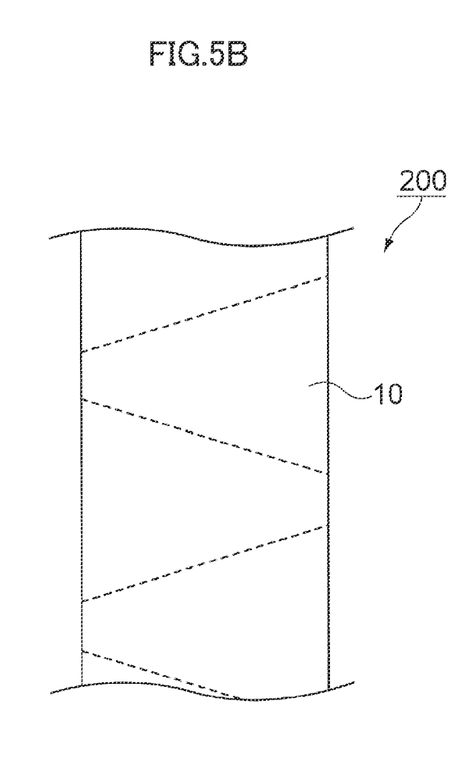
Figure 5C:
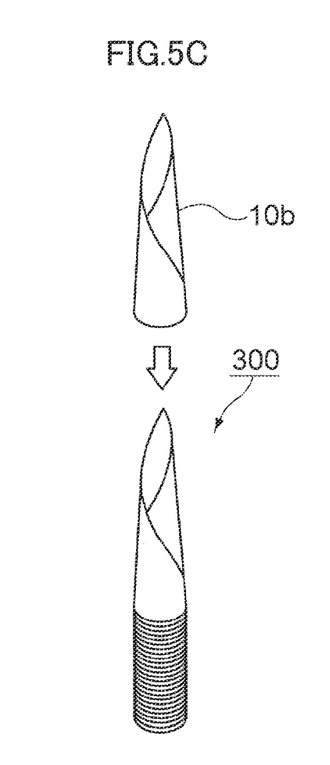

FIGS. 5A to 5C are diagrams for illustrating the first to third specific examples of the assembly of the input devices.

Here, FIG. 5A is a diagram for illustrating the first specific example of the assembly of the input devices 10.

An assembly 100 shown in FIG. 5A is the one in which the input devices 10 are laminated toward the thickness direction. The assembly 100 is provided by laminating the input devices 10 with the adhesive layer 13 interposed therebetween. By providing such an embodiment, in the case where the input device 10 is distributed, the input devices 10 can be distributed in group as the assembly 100. Accordingly, the users of input device 10 can use the input device 10 by taking the input device 10 from the assembly 100 one by one so that the input device 10 are worn on the writing material 20 or the finger 30 as the supporting body.

FIG. 5B is a diagram for illustrating the second specific example of the assembly of the input device 10.

The assembly 200 shown in FIG. 5B is the one in which the input devices 10 having trapezoidal shape are planately combined with each other. In this exemplary embodiment, the borders between the individual input devices 10 are perforated, thereby the individual input devices 10 are combined with each other. The users of the input device 10 can tear the part of the perforation of the assembly 200 to separate so that the input device 10 are worn on the writing material 20 and the finger 30 as the supporting body to use the input device 10.

In this exemplary embodiment, it is possible to form the assembly 200 into a tape shape by reversing a direction of the individual input devices 10 each other to combine. In the embodiment of rolling up the assembly having the tape shape, the assembly 200 can be distributed.

FIG. 5C is a diagram for illustrating the third specific example of the assembly of the input device 10.

In the assembly 300 shown in FIG. 5C, the input devices 10b having cylindrical shape are laminated to form the assembly 300. By providing such an embodiment, the users of the input device 10b can use the input device 10b by taking the input device 10b from the assembly 300 one by one so that the input device 10b are worn on the writing material 20 or the finger 30 as the supporting body. In this embodiment, it is not necessary to wind the input device 10 to be worn on the writing material 20 or the finger 30 as the supporting body. Thereby, the users can use the input device 10b immediately.

By providing the assembly with the input devices 10 as above-described, the users can carry around the assembly to immediately have the alternative input device 10 although the input device 10 is lost. Therefore the users are much less likely to lose any means for inputting into the touch panel though the input device 10 is lost.

REFERENCE SIGNS LIST

10 . . . Input device
11 . . . Insulating layer
12 . . . Conductive layer
13 . . . Adhesive layer
20 . . . Writing material
30 . . . Finger
40 . . . Touch panel
51 . . . FIG.
100, 200, 300 . . . Assembly

The invention claimed is:

1. An input device for inputting a position on a capacitive touch panel by making the input device contact with the touch panel via a contact surface, the input device comprising:
  an insulating layer that has flexibility and optical permeability; and
  a conductive layer that has optical permeability and is laminated onto the insulating layer, wherein
  the insulating layer and the conductive layer are integrally formed into a cylindrical shape so that the insulating layer and the conductive layer form the contact surface, and wherein the contact surface is a triangular area that extends from a pointed tip at a leading end portion of the input device to a bending portion of the input device.

2. The input device according to claim 1, further comprising an adhesive layer that is provided at least on a part of the insulating layer and the conductive layer.

3. The input device according to claim 1, wherein the cylindrical shape is formed so that the insulating layer is provided outside rather than the conductive layer.

4. The input device according to claim 1, wherein the shape is determined as a shape to be worn on a finger.

5. The input device according to claim 1, wherein a figure for illustrating an input position into the touch panel is pictured at least on any one of the insulating layer and the conductive layer.

6. An input method comprising:
  making the input device according to claim 1 contact with the touch panel to input a position on a capacitive touch panel.

7. An input device for inputting a position on a capacitive touch panel by making the input device contact with the touch panel via a contact surface, the input device comprising:
  an insulating layer that has flexibility; and
  a conductive layer that is laminated onto the insulating layer, wherein
  the insulating layer and the conductive layer are integrally formed into a cylindrical shape and have optical permeability at least on a portion thereof to be contacted with the touch panel, and wherein the contact surface is a triangular area that extends from a pointed tip at a leading end portion of the input device to a bending portion of the input device.

8. An input device for inputting a position on a capacitive touch panel by making the input device contact with the touch panel via a contact surface, the input device comprising:
  an insulating layer that has flexibility and optical permeability; and
  a conductive layer that has optical permeability and is laminated onto the insulating layer, wherein
  the insulating layer and the conductive layer form the contact surface and can be integrally bended so as to be fitted to the shape of a supporting body, and wherein the contact surface is a triangular area that extends from a pointed tip at a leading end portion of the input device to a bending portion of the input device.

9. The input device according to claim 8, further comprising an adhesive layer that is provided at least on a part of the insulating layer and the conductive layer.

10. The input device according to claim 8, wherein the supporting body is a finger.

11. The input device according to claim 8, wherein the insulating layer and the conductive layer integrally form a shape of pentagon or hexagon.

12. An assembly in which input devices for inputting a position on a capacitive touch panel by making the input device contact with the touch panel via a contact surface are gathered, wherein:
  the input devices include, at the contact surface, an insulating layer that has a flexibility and optical permeability, and a conductive layer that has optical permeability and is laminated onto the insulating layer, and wherein the contact surface is a triangular area that extends from a pointed tip at a leading end portion of the input device to a bending portion of the input device; and
  the input devices are gathered by any one of (1) to (3) below,
  (1) further including an adhesive layer provided at least on a part of the input device and making the input devices laminated with the adhesive layer interposed therebetween,
  (2) planately combining the input devices with each other, and
  (3) forming the input device to be cylindrical shape and making the input devices of cylindrical shape laminated.

* * * * *